US011816397B2

(12) United States Patent
Benjamin et al.

(10) Patent No.: US 11,816,397 B2
(45) Date of Patent: Nov. 14, 2023

(54) GENERATING DESIGNS FOR MULTI-FAMILY HOUSING PROJECTS USING RIGID BODY SIMULATIONS

(71) Applicant: AUTODESK, INC., San Francisco, CA (US)

(72) Inventors: David Benjamin, Brooklyn, NY (US); Dale Zhao, New York, NY (US); Lorenzo Villaggi, Brooklyn, NY (US)

(73) Assignee: AUTODESK, INC., San Francisco, CA (US)

( * ) Notice: Subject to any disclaimer, the term of this patent is extended or adjusted under 35 U.S.C. 154(b) by 261 days.

(21) Appl. No.: 17/099,665

(22) Filed: Nov. 16, 2020

(65) Prior Publication Data
US 2021/0150094 A1 May 20, 2021

Related U.S. Application Data

(60) Provisional application No. 62/937,185, filed on Nov. 18, 2019.

(51) Int. Cl.
*G06F 30/13* (2020.01)
*G06F 30/20* (2020.01)
*G06F 30/12* (2020.01)
*G06F 111/02* (2020.01)
*G06F 111/04* (2020.01)

(52) U.S. Cl.
CPC .............. *G06F 30/13* (2020.01); *G06F 30/12* (2020.01); *G06F 30/20* (2020.01); *G06F 2111/02* (2020.01); *G06F 2111/04* (2020.01)

(58) Field of Classification Search
CPC .......... G06F 30/13; G06F 30/12; G06F 30/20; G06F 2111/04
See application file for complete search history.

(56) References Cited

U.S. PATENT DOCUMENTS

2020/0398492 A1* 12/2020 Corkum ................... B25J 15/06

OTHER PUBLICATIONS

Arvin et al. Modeling Architectural Design Objectives in Physically Based Space Planning Automation Construction 11, 2002 pp. 213-225 (Year: 2002).*
Fiedler Physics in 3D Sep. 2, 2004 (Year: 2004).*
Hsu Constraint Based Space Planning: A Case Study ACADDIA Quarterly 19:3 2000 (Year: 2000).*

* cited by examiner

*Primary Examiner* — Rehana Perveen
*Assistant Examiner* — Cuong V Luu
(74) *Attorney, Agent, or Firm* — Artegis Law Group, LLP

(57) ABSTRACT

A design simulator executes a rigid body simulation to position design elements within various design options according to configurations that meet design criteria while also promoting feasibility and desirability. The design simulator assigns physical properties to each design element, including a mass value and a velocity value. The design simulator then simulates rigid body interactions between design elements over a sequence of simulation steps. The design simulator stops the rigid body simulation when no collisions between design elements are detected or when other termination criteria are met. Once the rigid body simulation is complete, the final positions of each design element relative to one another represent a specific configuration of design elements for the corresponding design option.

23 Claims, 8 Drawing Sheets

GENERATING DESIGNS FOR MULTI-FAMILY HOUSING PROJECTS USING RIGID BODY SIMULATIONS

CROSS-REFERENCE TO RELATED APPLICATIONS

This application claims the priority benefit of United States provisional patent application titled, "Generative Design Techniques for Multi-Family Housing Projects," filed on Nov. 18, 2019 and having Ser. No. 62/937,185. The subject matter of this related application is hereby incorporated herein by reference.

BACKGROUND

Field of the Various Embodiments

The various embodiments relate generally to computer-aided design technology and, more specifically, to generating designs for multi-family housing projects using rigid body simulations.

Description of the Related Art

A residential design company or other organization occasionally generates designs on a "speculative" basis by identifying an undeveloped parcel of land that is zoned for residential development and then proposing a design for a multi-family housing project to the landowner who owns the parcel. If the landowner approves of the proposed design, or some version thereof, then the landowner can engage with the residential design organization to develop the parcel according to the proposed design. Once the multi-family housing project is complete, the landowner typically rents or leases the individual housing units within the multi-family housing project to different families in order to provide those families with housing and to generate a recurring revenue stream. In this fashion, the residential design company or other organization benefits landowners who own undeveloped parcels as well as families in need of housing.

A residential design company or other organization that operates on a "speculative" basis usually includes a design team that is tasked with generating different designs for target multi-family housing projects. The design team typically uses computer-aided design (CAD) software or similar software to generate the different designs. One of the challenges faced when generating a given design is how to optimally position various design elements, such as buildings, parking lots and spaces, walkways, and other common design elements relative to the property boundaries of a given undeveloped parcel of land. Another challenge faced when generating a given design is ensuring that the design is compliant with local construction regulations and, accordingly, considered "feasible" to regulators and also ensuring that the design meets specified financial targets and, accordingly, is considered "desirable" to landowners.

The different designs generated by a design team conceptually occupy distinct positions within a multi-dimensional "design space" that encompasses the universe of possible designs that could be generated for a given undeveloped parcel of land. Most of the designs included in the design space are either unfeasible or undesirable or both because those designs do not comply with the relevant construction regulations and/or do not meet the relevant financial targets. A small number of designs included in the design space are considered both feasible and desirable because those designs both comply with the relevant construction regulations and meet the relevant financial targets. Feasible and desirable designs are comparatively scarce in the design space because design features that promote compliance with construction regulations tend to reduce financial performance and, similarly, design features that promote financial performance tend to reduce compliance with regulations. During the design process, the design team explores the design space in an attempt to generate as many designs as possible that are considered both feasible and desirable. As a general matter, the greater the number of feasible and desirable designs that can be generated, the greater the likelihood that an optimal design for a given target project can be determined.

One drawback of current approaches to generating designs for multi-family housing projects is that conventional CAD software is not configured to effectively navigate the design space and steer the design process towards regions of the design space where both feasible and desirable designs reside. In this regard, one limitation of conventional CAD software is that conventional CAD software does not incorporate functionality to automatically generate and position design elements relative to one another in design configurations that comply with construction regulations and also satisfy financial targets. Consequently, designs generated using conventional CAD software are predominately unfeasible, undesirable, or both, which substantially reduces the likelihood of determining an optimal design for a given target project. Another limitation of conventional CAD software is that conventional CAD software does not incorporate functionality to automatically modify a given design based on feedback received from a landowner without adversely impacting either the desirability or the feasibility of the design, which further reduces the likelihood of determining an optimal design for a given target project.

As the foregoing illustrates, what is needed in the art are more effective techniques for generating designs for multi-family housing projects.

SUMMARY

Various embodiments include a computer-implemented method for generating designs for multi-family housing projects via a computer-aided design (CAD) application, including determining, via a design simulator included in the CAD application, a first set of physical properties for a building model that describes one or more buildings configured to occupy a parcel of land, determining, via the design simulator, a second set of physical properties for a parking lot model that describes a parking lot configured to occupy the parcel of land, performing, via the design simulator, a computer simulation of one or more collisions between the building model and the parking lot model based on the first set of physical properties and the second set of physical properties, and generating a first design option based on the one or more collisions.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to automatically position design elements relative to one another in design configurations that are feasible and desirable. These technical advantages represent tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
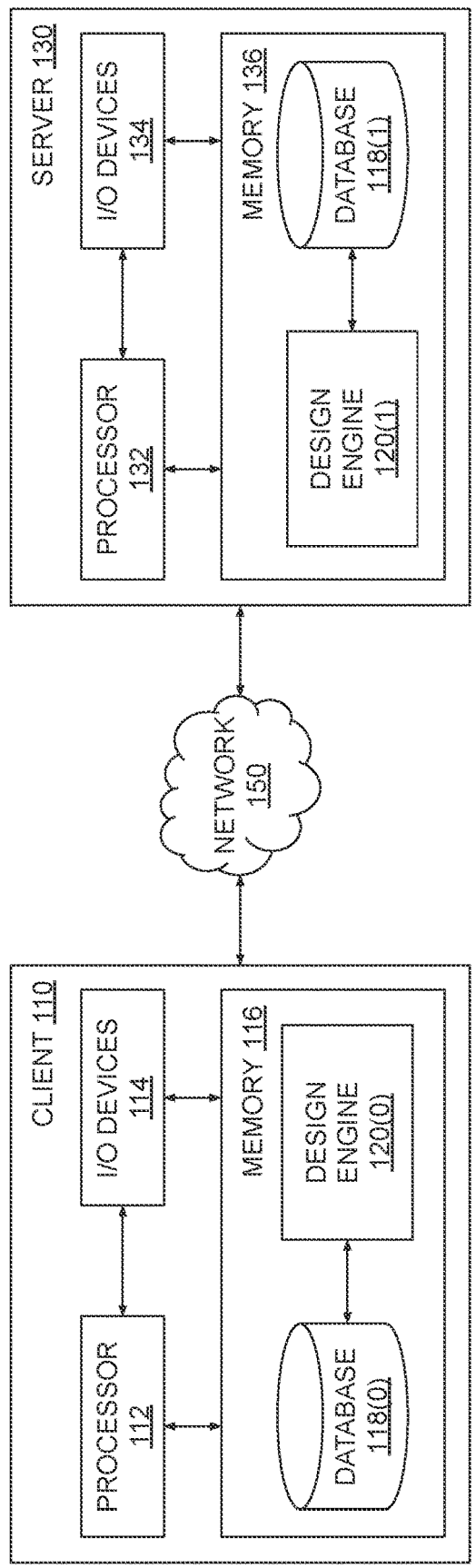
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, a residential design company or other organization that operates on a "speculative" basis typically includes a design team that uses conventional CAD software to generate designs for multi-family housing projects. When generating designs, the design team typically has to work within the guidelines of local construction regulations to generate designs that are considered "feasible" to regulators and also has to work towards specific financial targets to generate designs that are considered "desirable" to landowners. Designs generated using conventional CAD software conceptually occupy distinct positions within a multi-dimensional "design space" that encompasses the universe of possible designs that could be generated for a given undeveloped parcel of land. A very small number of designs included in the design space are considered both feasible and desirable. This situation poses specific difficulties that conventional CAD software cannot effectively address.

In particular, when navigating the design space, conventional CAD software cannot effectively generate and position design elements according to configurations that promote compliance with construction regulations and achievement of financial targets. Consequently, designs generated using conventional CAD software are predominately unfeasible, undesirable, or both, which frequently causes landowners to reject most designs for multi-family housing projects. Conventional CAD software also cannot usually be used to modify a given design to incorporate feedback received from a landowner without adversely impacting either the desirability or the feasibility of the design, further limiting the success rate of designs generated via conventional CAD software.

To address these issues, various embodiments include a design engine that is configured to automatically generate designs for multi-family housing projects that simultaneously meet local construction regulations while also meeting specific financial targets. The design engine includes a design analyzer, a site analyzer, a design generator, and a design evaluator. The design analyzer generates design trends based on a historical database of designs. The site analyzer generates design criteria based on relevant construction regulations associated with a given parcel of land. The design generator generates design options that reflect the design trends while also complying with the construction regulations.

The design generator includes a site design generator, a parking lot design generator, a building design generator, and a design simulator. The site design generator generates a site model that describes geometric attributes of the parcel of land. The building design generator analyzes the site model to generate a building model that describes one or more buildings configured to occupy the parcel of land. The parking lot design generator analyzes the site model and the building model to generate a parking lot model that describes a parking lot configured to occupy a remaining portion of the parcel of land. The design simulator executes various types of physical simulations based on the site model, the building model, and/or the parking lot model in order to generate a vast number of different design options with widely varying configurations of design elements.

In particular, the design simulator executes a rigid body simulation to position the design elements of various design options according to configurations that meet design criteria while also promoting feasibility and desirability. The design simulator assigns physical properties to each design element, including a mass value and a velocity value, among other possible physical properties. The design simulator then simulates rigid body interactions between design elements over a sequence of simulation steps. A given rigid body interaction may include elastic or inelastic collisions between design elements, among other types of interactions. The design simulator stops the rigid body simulation when no collisions between design elements are detected or when other termination criteria are met. Once the rigid body simulation is complete, the final positions of each design element relative to one another represent a specific configuration of design elements for the corresponding design option.

The design evaluator analyzes the design options generated via the above approach and generates various design metrics. The design metrics describe specific geometric properties of the design options as well as various financial projections associated with those design options. Based on the design metrics, the design generator generates additional design options that better meet the design criteria. The design engine and design evaluator operate iteratively in this manner to generate design options having successively improved configurations of design elements. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to automatically position design elements relative to one another in design configurations that are feasible and desirable. These technical advantages represent tangible and meaningful technological improvements over conventional CAD applications.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and/or a touchscreen, among others.

Memory 116 includes any technically feasible storage media configured to store data and software applications, such as, for example, a hard disk, a random-access memory (RAM) module, and/or a read-only memory (ROM). Memory 116 includes a database 118(0) and a design engine 120(0). Database 118(0) stores various data that is processed by design engine 120(0). Design engine 120(0) is a software application that, when executed by processor 112, interoperates with a corresponding software application executing on server 130 to perform various operations described in greater detail herein.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, and/or a touchscreen, among others.

Memory 136 includes any technically feasible storage media configured to store data and software applications, such as, for example, a hard disk, a RAM module, and/or a ROM. Memory 136 includes a database 118(1) and a design engine 120(1). Database 118(1) stores various data that is processed by design engine 120(1). Design engine 120(1) is a software application that, when executed by processor 132, interoperates with design engine 120(0) executing on client 110 to perform the various operations described in greater detail herein.

As a general matter, databases 118(0) and 118(1) represent separate portions of a distributed storage entity. Thus, for simplicity, databases 118(0) and 118(1) are collectively referred to hereinafter as database 118. Similarly, design engines 120(0) and 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to automatically generate design options for multi-family housing projects that can be constructed on a given parcel of land. Design engine 120 is configured to generate the design options based on historical design trends as well as local construction regulations that govern development of the parcel of land. Design engine 120 analyzes the design options to identify those with projected financial performance that may be desirable to a landowner who owns the undeveloped parcel of land. Design engine 120 is further configured to incorporate into the identified design options various types of modifications that may be suggested by the landowner while maintaining compliance with local construction regulations. In this manner, design engine 120 is configured to support a "speculative" approach to multi-family housing project design and development.

Software Overview

Figure 2:
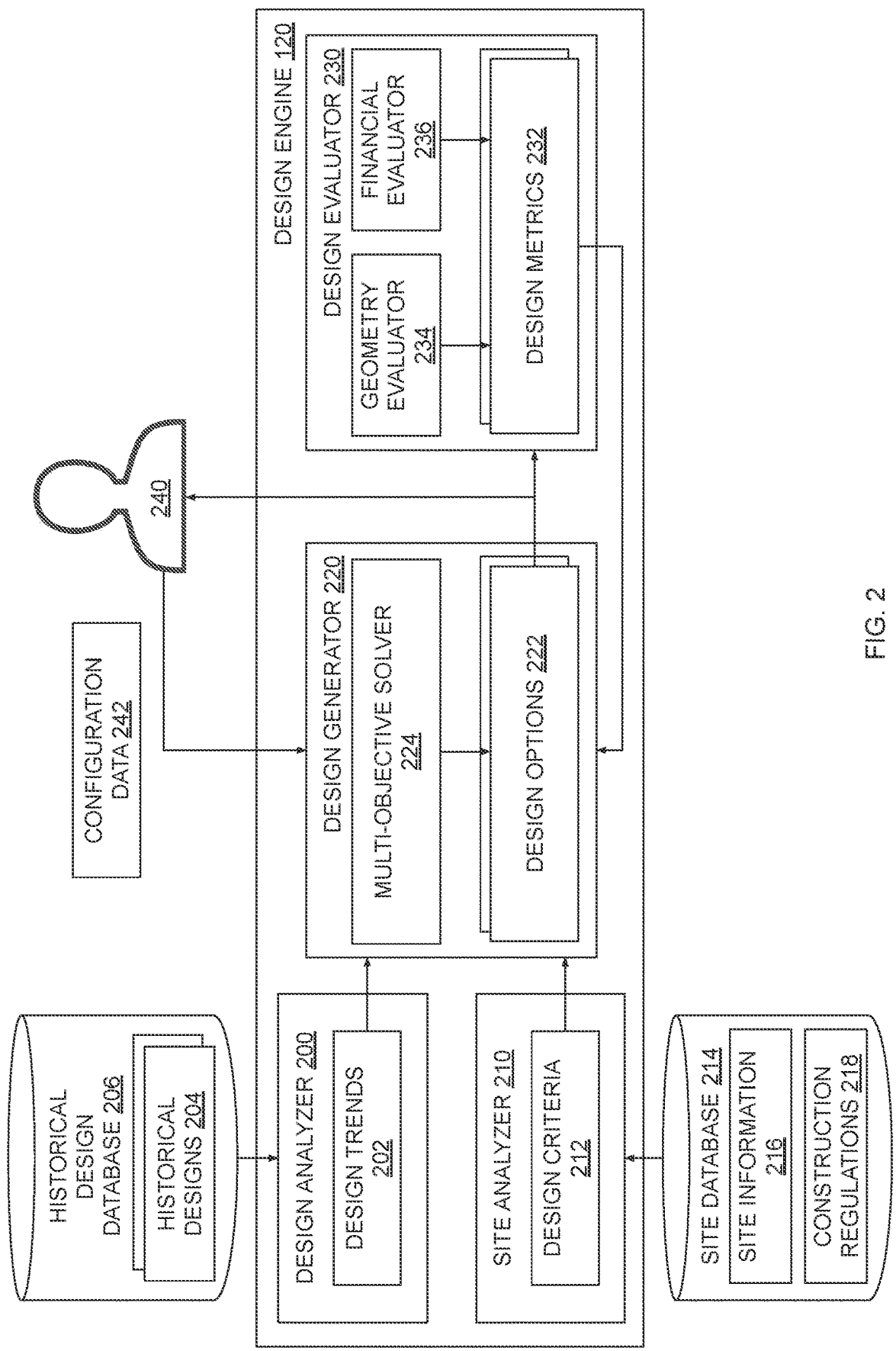
FIG. 2 is a more detailed illustration of the design engine of FIG. 1, according to various embodiments.

FIG. 2 is a more detailed illustration of the design engine of FIG. 1, according to various embodiments. As shown, design engine 120 includes a design analyzer 200, a site analyzer 210, a design generator 220, and a design evaluator 230. These various software modules are configured to interoperate with one another in order to implement the various operations performed by design engine 120.

Design analyzer 200 is configured to generate design trends 202 based on an analysis of historical designs 204 that reside within historical design database 206. Historical designs 204 generally include designs for multi-family housing projects that were previously accepted by landowners and used to develop corresponding parcels of land. Design trends 202 generally include geometric construction rules that can be used to generate designs having similar features to historical designs 204. Design analyzer 200 generates design trends 202 by performing a geometric analysis of historical designs 204 to extract a set of features from those designs and then parameterizing the extracted features to produce a set of parametric values. Design analyzer 200 determines various relationships between individual subsets of parametric values to generate one or more design trends 202.

For example, design analyzer 200 could analyze a set of historical designs 204 in which various apartment complexes are aligned in an East-West direction. Design analyzer 200 could extract an alignment feature from each historical design 204 and then parameterize the extracted features to generate a set of values representing the alignment of the various apartment complexes. Design analyzer 200 could then determine that the various parametric values are correlated with each other and generate a design trend 202 indicating that an East-West alignment for apartment complexes is preferable when generating design options 222. Persons skilled in the art will understand how these techniques can be applied to generate design trends 202 representing any technically feasible feature of historical designs 204.

Site analyzer 210 is configured to generate design criteria 212 based on an analysis of site information 214 and construction regulations 216 stored in site database 218. Site information 214 includes data and metadata associated with a given parcel of land, including a geographic location, a set of property boundaries, a property area value, geometric attributes of the parcel such as topology and/or topography, and so forth. Construction regulations 216 include various zoning regulations, building codes, land use requirements, and other types of governances that dictate how development of the parcel of land can and/or should occur. Construction regulations 216 may be applicable based on the geographic location of the parcel of land or specifically applicable to the parcel of land for various reasons.

Site analyzer 210 processes site information 214 and construction regulations 216 to synthesize a set of design criteria 212 that feasible designs should meet. A given design criterion 212 may include a design objective or a design constraint. A design objective could be, for example, that designs should maximize the amount of area that is devoted to buildings versus landscaping or other design features. A given design constraint could be, for example, that designs should not include buildings that are placed outside of property boundaries or exceed a given height.

Design generator 220 is configured to process design trends 202 and design criteria 212 in order to generate successive generations of design options 222. Each design option 222 describes a multi-family housing project corresponding to the parcel of land described in site information 214. Design generator 220 performs various geometric construction techniques to generate, for each design option 222, geometry that describes one or more buildings, parking lots and spaces, walkways, landscaping features, and other design elements typically found in multi-family housing projects. In one embodiment, design generator 220 may include a multi-objective solver 224 that is configured to implement a set of mathematical optimization algorithms to generate the various design elements found in each design option 222. Design generator 220 is described in greater detail below in conjunction with FIG. 3.

Design evaluator 230 is configured to generate various design metrics 232 that quantify specific attributes of design options 222. In particular, design evaluator 230 includes a geometry evaluator 234 that evaluates geometric attributes of design options 222 as well as a financial evaluator 236 that evaluates financial attributes of design options 222. Geometric evaluator 234 can generate any technically feasible type of metric associated with the geometry of a given design option 222, including the total square footage of the design option, the overall habitable volume of the design option, the floor area ratio (FAR) of the design option, the building coverage ratio (BCR) of the design option, and so forth. Financial evaluator 236 can generate any technically feasible type of metric that describes financial projections for a given design option 222, including the construction cost of the design option, the projected rental revenue of the design option, the return-on-investment (ROI) associated with the design option, and so forth. In various embodiments, geometric evaluator 234 and/or financial evaluator 236 can be used to quantify the degree to which design criteria 212 are met.

Design evaluator 230 generates design metrics 232 via geometry evaluator 234 and financial evaluator 236 and then provides those design metrics to design generator 220 in order to inform the generation of additional design options 222. In this manner, design generator 220 and design evaluator 230 operate iteratively in order to generate successive generations of design options 222 having design metrics 232 that improve over time while continuing to meet design criteria 212 and construction regulations 216. When certain convergence criteria are met, design generator 220 outputs design options 222 to user 240. In various embodiments, multi-objective solver 224 implements one or more evolutionary and/or genetic algorithms in order to modify design options 222, based on corresponding design metrics 232, to generate successive generations of design options 222. Via the above techniques, design generator 220 is configured to explore a vast multi-dimensional design space that includes a multitude of design options 222 having widely varying characteristics. With conventional CAD software, only a small subset of this design space is accessible, leading to designs that are either unfeasible, undesirable, or both.

In one embodiment, design generator 220 is configured to obtain configuration data 242 from a user 240 and to then generate and/or modify design options 222 based on that data. Configuration data 242 may include any technically feasible type of data that can be used to guide the generation of design options 222, including financial targets for design options 222, design preferences related to the layout and/or orientation of buildings within the multi-family housing project, target occupancy metrics for the multi-family housing project, design rules and/or constraints that reflect various aesthetic preferences of user 240 and/or the landowner, landowner feedback in general, and so forth.

In various embodiments, design engine 120 may perform computer simulations of various design elements included in each design option 222 to generate one or more designs. Design engine 120 may then render those designs for display to a user via a display device. Design engine 120 may also generate a graphical user interface (GUI) and render the GUI for display to the user via the display device. Using one or more input devices, the user may then interact with the rendered design(s) using the GUI in order to input feedback, alter design criteria, and make other modifications to those designs. Design engine 120 may then run further simulations to generate additional design options 222 and then render updated designs for display to the user.

Advantageously, the techniques described above can be incorporated into CAD software to enable the CAD software to automatically generate and/or modify configurations of design elements for multi-family housing projects that balance the competing objectives of complying with complex construction regulations and simultaneously achieving target financial projections. Accordingly, CAD software that implements the disclosed techniques can reliably and deterministically generate designs for multi-family housing projects that are considered both feasible from a regulatory standpoint and desirable from a financial performance perspective.

Generating Designs Using Physical Simulations

Figure 3:
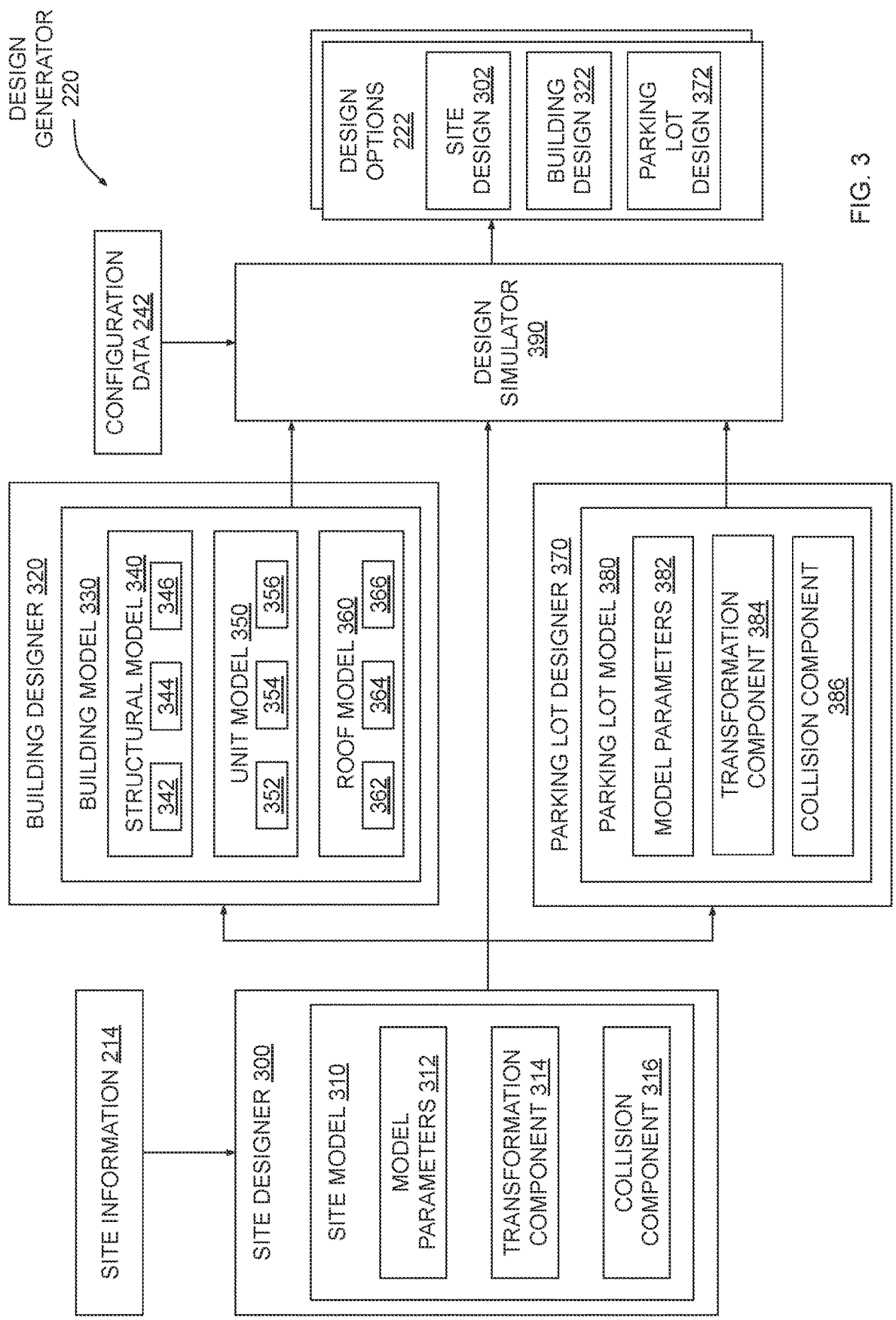
FIG. 3 is a more detailed illustration of the design generator of FIG. 2, according to various embodiments.

FIG. 3 is a more detailed illustration of the design generator of FIG. 2, according to various embodiments. As shown, design generator 220 includes a site design generator 300, a building design generator 320, a parking lot design generator 370, and a design simulator 390. Site design generator 300 includes site model 310. Site model 310 is a three-dimensional (3D) model associated with a given parcel of land. Building design generator 320 includes a building model 330. Building model 330 is a 3D model of one or more buildings configured to occupy a portion of the parcel of land. Parking lot design generator 370 includes a parking lot model 380. Parking lot model 380 is a 3D model of a parking lot configured to occupy another portion of the parcel of land. Design simulator 390 is configured to execute various types of 3D simulations with site model 310, building model 330, and parking lot model 380 in order to generate and/or modify a site design 302, a building design 322, and/or a parking lot design 372.

Site design generator 300 generates site model 310 based on site information 214. Site information 214 includes data that is generally applicable to the parcel of land, including property boundaries associated with the parcel of land, one or more regulations governing development on the parcel of land, and so forth, as described above in conjunction with FIG. 2. Site model 310 includes model parameters 312, transformation component 314, and collision component 316. Model parameters 312 includes parametric values that describe 3D geometry associated with the parcel of land, including the 3D topology of the parcel of land, a 3D volume of space surrounding the parcel of land, and 3D slant planes associated with the property boundaries of the parcel of land, among others. Transformation component 314 indicates any geometric transformations that can be applied to site model 310, including transformations that can be made to the 3D topology of the parcel of land. Collision component 316 includes one or more functions that can be evaluated to detect collisions with any of the 3D geometry described in model parameters 312. Design simulator 390 is configured to generate one or more physical simulations that involve site model 310 using model parameters 312, transformation component 314, and collision component 316, in order to generate site design 302, as described in greater detail below.

Building design generator 320 generates building model 330 within the 3D volume of space set forth in site model 310 and using design trends 202, design criteria 212, and configuration data 242 discussed above in conjunction with FIG. 2. In so doing, building design generator 320 applies geometric construction rules set forth in design trends 202 to generate geometry that meets design criteria 212 and is configured according to configuration data 242. Building model 330 includes a structural model 340, a unit model 350, and a roof model 360.

Structural model 340 is a 3D model of one or more buildings and includes model parameters 342, a transformation component 344, and a collision component 346. Model parameters 342 include parametric values that describe the 3D geometry of the structure of the aforesaid buildings. Transformation component 344 indicates any geometric transformations that can be applied to that 3D geometry, including translation, rotation, and/or scaling transformations, as well as transformations that modify the 3D geometry directly. Collision component 346 includes one or more functions that can be evaluated to detect collisions with the 3D geometry set forth in model parameters 342.

Unit model 350 is a 3D model of a set of dwelling units and includes model parameters 352, a transformation component 354, and a collision component 356. Model parameters 352 include parametric values that describe the 3D geometry of each dwelling unit. Transformation component 354 indicates any geometric transformations that can be applied to that 3D geometry, including translation, rotation, and/or scaling transformations, as well as transformations that modify the 3D geometry directly. Collision component 356 includes one or more functions that can be evaluated to detect collisions with the 3D geometry set forth in model parameters 352.

Roof model 360 is a 3D model of one or more roof structures and includes model parameters 362, a transformation component 364, and a collision component 366. Model parameters 362 include parametric values that describe the 3D geometry of the one or more roof structures. Transformation component 364 indicates any geometric transformations that can be applied to that 3D geometry, including translation, rotation, and/or scaling transformations, as well as transformations that modify the 3D geometry directly. Collision component 366 includes one or more functions that can be evaluated to detect collisions with the 3D geometry set forth in model parameters 362.

Structural model 340, unit model 350, and roof model 360 collectively describe the 3D geometry, and any applicable transformations thereto, for the interior and exterior of the one or more buildings mentioned above. Design simulator 390 is configured to generate one or more physical simulations that involve building model 320 using the different sets of model parameters, transformation components, and collision components included in building model 330 in order to generate building design 322, as described in greater detail below.

Parking lot model 380 is a 3D model of a parking lot and includes model parameters 382, a transformation component 384, and a collision component 386. Model parameters 382 include parametric values that describe the 3D geometry of different design elements that describe a parking lot, such as parking spaces and driveway areas. Transformation component 384 indicates any geometric transformations that can be applied to that 3D geometry, including translation, rotation, and/or scaling transformations, as well as transformations that modify the 3D geometry directly. Collision component 386 includes one or more functions that can be evaluated to detect collisions with the 3D geometry set forth in model parameters 382. Design simulator 390 is configured to generate one or more physical simulations that involve parking lot model 380 using model parameters 382, transformation component 384, and collision component 386 in order to generate parking lot design 372, as described in greater detail below.

Design simulator 390 is configured to execute physical simulations of design elements within individual models and to also execute physical simulations that involve multiple different models. In one embodiment, design simulator 390 may execute a rigid body simulation based on structural model 340, unit model 350, and roof model 360 in order to reconfigure the arrangement of design elements within the overarching building model 330. In so doing, design simulator 390 simulates elastic and/or inelastic collisions between 3D geometry set forth in structural model 340, unit model 350, and roof model 360 to determine an arrangement of design elements that does not violate a set of physical constraints.

In another embodiment, design simulator 390 executes a shape grammar algorithm based on parking lot model 380 to simulate the spatial evolution of a discrete set of shapes based on a set of governing rules. Design simulator 390 detects collisions between these shapes and other 3D geometry and then applies various corrections to enforce compliance with a set of physical constraints.

In another embodiment, design simulator 390 executes a rigid body simulation that involves site model 310 and building model 330 in order to reconfigure the positioning of 3D geometry associated with one or more buildings to mitigate intersections between the building(s) and slant planes associated with one or more property boundaries. Parking lot model 380 may also participate in this rigid body simulation so that 3D geometry corresponding to a parking lot can be reconfigured to accommodate the reconfiguration of the building(s). These particular techniques are described in greater detail below in conjunction with FIGS. 4-6.

As a general matter, design simulator 390 can execute any technically feasible type of physical simulation based on one or more sets of model parameters, transformation components, and collision components. Via these physical simulations, design simulator 390 generates site design 302, building design 322, and parking lot design 372. These various designs represent the final positions of site model 310, building model 330, and parking lot model 380 after a sequence of simulation steps.

In one embodiment, design generator 220 may be implemented using a "scene graph" approach in which the logical configuration of various modules, such as the various design generator modules described above, parallels the spatial organization of design elements within any given design option. In such implementations, any given module included in an overarching scene graph can include a set of model parameters that describes specific 3D geometry for a given set of design features, a transformation component that describes transformations to that 3D geometry, and a collision component that can be used to detect collisions with the 3D geometry. These parameters and components allow the corresponding 3D geometry to participate in physical simulations executed by design simulator 390. With this approach, additional modules can be added to design generator 220 to expand the types of design elements that can be simulated and generated for any given design option 222.

Generating Designs Using Rigid Body Simulations

Figure 4:
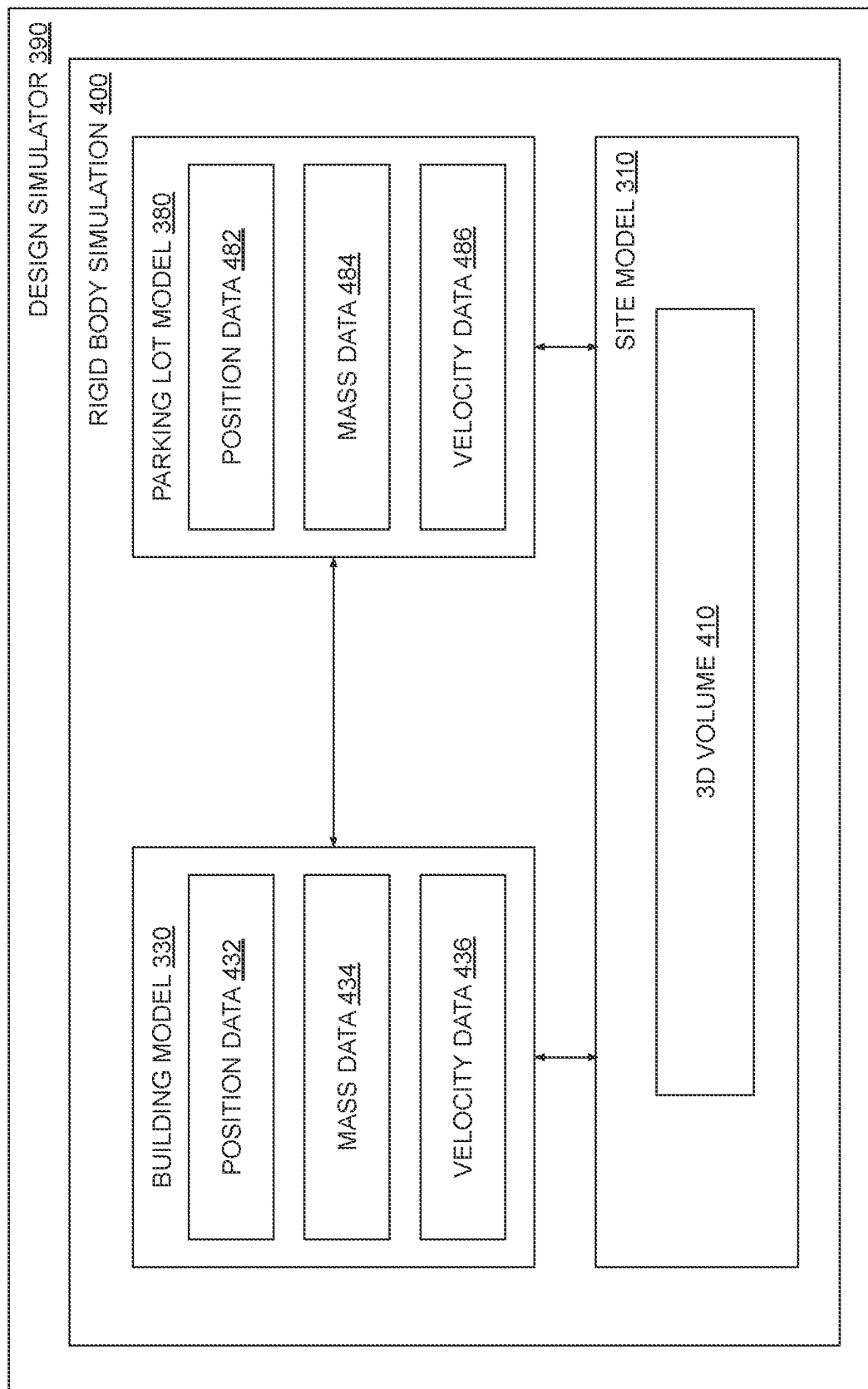
FIG. 4 is a more detailed illustration of the design simulator of FIG. 3, according to various embodiments.

FIG. 4 is a more detailed illustration of the design simulator of FIG. 3, according to various embodiments. As shown, design simulator 390 includes a rigid body simulation 400 that, in turn, is configured to include site model 310, building model 330, parking lot model 380 of FIG. 3. As described above in conjunction with FIG. 3, site model 310, building model 330, and parking lot model 380 include various data that describes 3D geometry associated with various design elements. Design simulator 390 is configured to execute rigid body simulation 400 based on the various models shown in order to simulate physical interactions between the corresponding 3D geometry. In so doing, design simulator 390 assigns building model 330 and parking lot model 400 various physical properties that permit different types of dynamics to be simulated.

In particular, design simulator 390 assigns building model 330 position data 432, mass data 434, and velocity data 436. Position data 432 indicates one or more positions associated with building model 330 within rigid body simulation 400. Mass data 434 indicates one or more mass values associated with building model 330 within rigid body simulation 400. Velocity data 436 indicates one or more velocity values associated with building model 330 within rigid body simulation 400. Any of the above-described physical properties can be assigned to building model 330 as a whole, to different design elements of building model 330, and/or to specific subsets of vertices within the overarching 3D geometry associated with building model 330.

In like fashion, design simulator 390 assigns parking lot model 380 position data 482, mass data 484, and velocity data 486. Position data 482 indicates one or more positions associated with parking lot model 380 within rigid body simulation 400. Mass data 484 indicates one or more mass values associated with parking lot model 330 within rigid body simulation 400. Velocity data 486 indicates one or more velocity values associated with parking lot model 380 within rigid body simulation 400. Any of the above-described physical properties can be assigned to parking lot model 380 as a whole, to different design elements of parking lot model 380, and/or to specific subsets of vertices within the overarching 3D geometry associated with parking lot model 380.

In one embodiment, design simulator 390 may assign physical properties to building model 330 and parking lot model 380 that reflect the 3D geometry corresponding to those models. For example, design simulator 390 could estimate the mass of a building described by building model 330 based on the volume of corresponding 3D geometry and then set mass data 434 based on that estimated mass. Alternatively, design simulator 390 may assign physical properties to those models in order to effect specific type of dynamics. For example, design simulator 390 could assign building model 330 a very high mass value in order to limit how freely building model 330 moves during simulation. Similarly, design simulator 390 could assign parking lot model 380 a very low mass value in order to encourage significant movement of parking lot model 380 during simulation.

In addition to assigning physical properties to building model 330 and parking lot model 380 in the fashion discussed above, design simulator 390 also generates a 3D volume 410 within site model 310 within which design simulator 390 simulates the various physical interactions between building model 330 and parking lot model 380. In one embodiment, 3D volume 410 is defined based on one or more slant planes associated with the property boundaries of the parcel of land corresponding to site model 310.

Design simulator 390 configures rigid body simulation 400 via the above operations and then executes rigid body simulation 400 across a sequence of simulation steps. At each simulation step, design simulator 390 applies one or more simulation rules, such as physical laws of motion, that govern the dynamics of building model 330 and parking lot model 380. In so doing, design simulator 390 can implement any of the transformation components discussed above in conjunction with FIG. 3 in order to apply translations and/or rotations to building model 330 and/or parking lot model 380. For example, design simulator 390 could increment one or more coordinate values set forth in position data 432 in order to apply a translation to building model 380 within 3D volume 410. Similarly, design simulator 390 could modify one or more coordinate values set forth in position data 482 in order to apply a rotation to parking lot model 380 within 3D volume 410.

Design simulator 390 can also implement any of the collision components discussed above in conjunction with FIG. 3 in order to compute translations and/or rotations for building model 330 and/or parking lot model 380 that occur in response to collisions between 3D geometry associated with those models. Persons familiar with physical simulations will understand how design simulator 390 would use the various physical properties discussed herein in order to compute updated position data and velocity data for building model 330 and parking lot model 380 across different simulation steps and in response to various types of collisions.

Design simulator 390 executes rigid body simulation 400 until one or more termination criteria are met. Designs simulator 390 may implement any technically feasible termination criterion. For example, design simulator 390 may execute rigid body simulation 400 for a preset number of simulation steps or execute rigid body simulation 400 until no additional collisions occur. In one embodiment, design simulator 390 may configure any of the physical properties associated with building model 330 and/or parking lot model 380 based on configuration data 242 shown in FIG. 2. When rigid body simulation 400 terminates, position data 432 and 482 represent the final positions of the various design elements included in building model 330 and parking lot model 380, respectively, and therefore represent a specific configuration of design elements for a given design option 222. In this manner, design simulator 390 can generate different design options 222 having widely varying configurations of design elements. In various embodiments, design simulator 390 may execute different instances of rigid body simulation 400 with varying assignments of physical properties and/or different initial conditions for a given design option 222 in order to generate a range of design element configurations for that design option 222. An example of how design simulator 390 executes rigid body simulation 400 is described in greater detail below in conjunction with FIGS. 5A-5C.

Figure 5A:
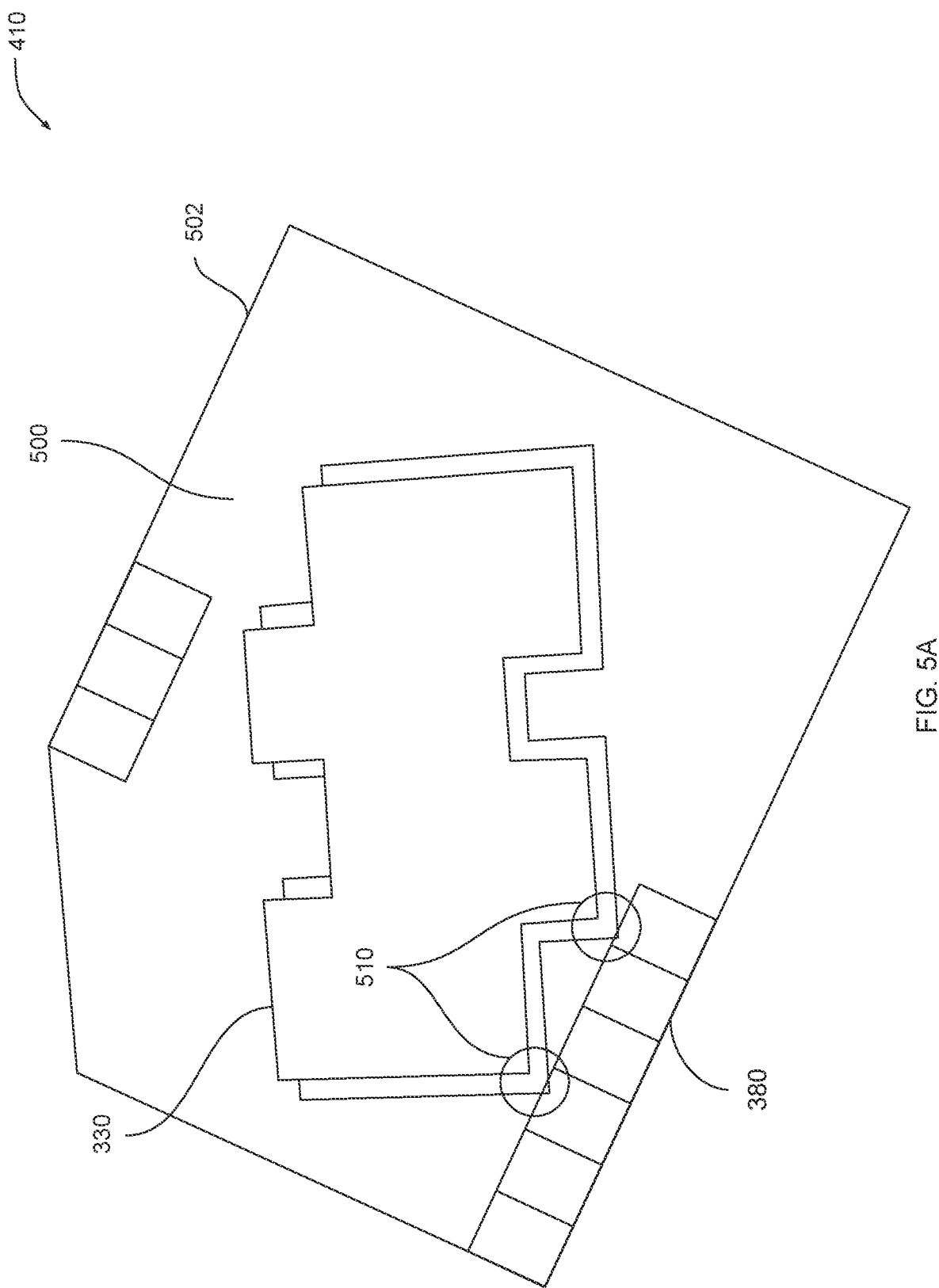
FIGS. 5A-5C illustrate how the design simulator of FIG. 3 executes a rigid body simulation, according to various embodiments.
Figure 5B:
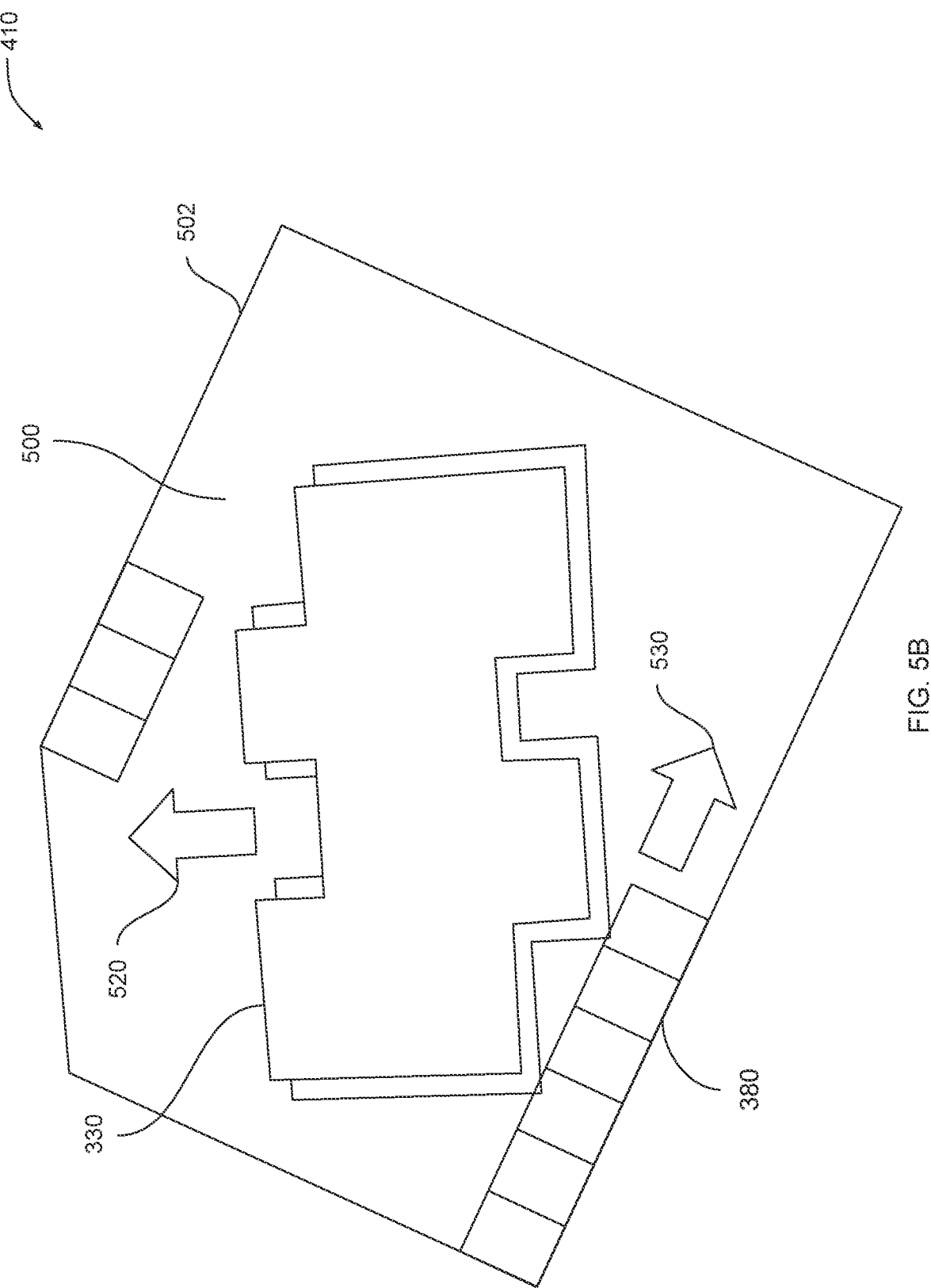
Figure 5C:
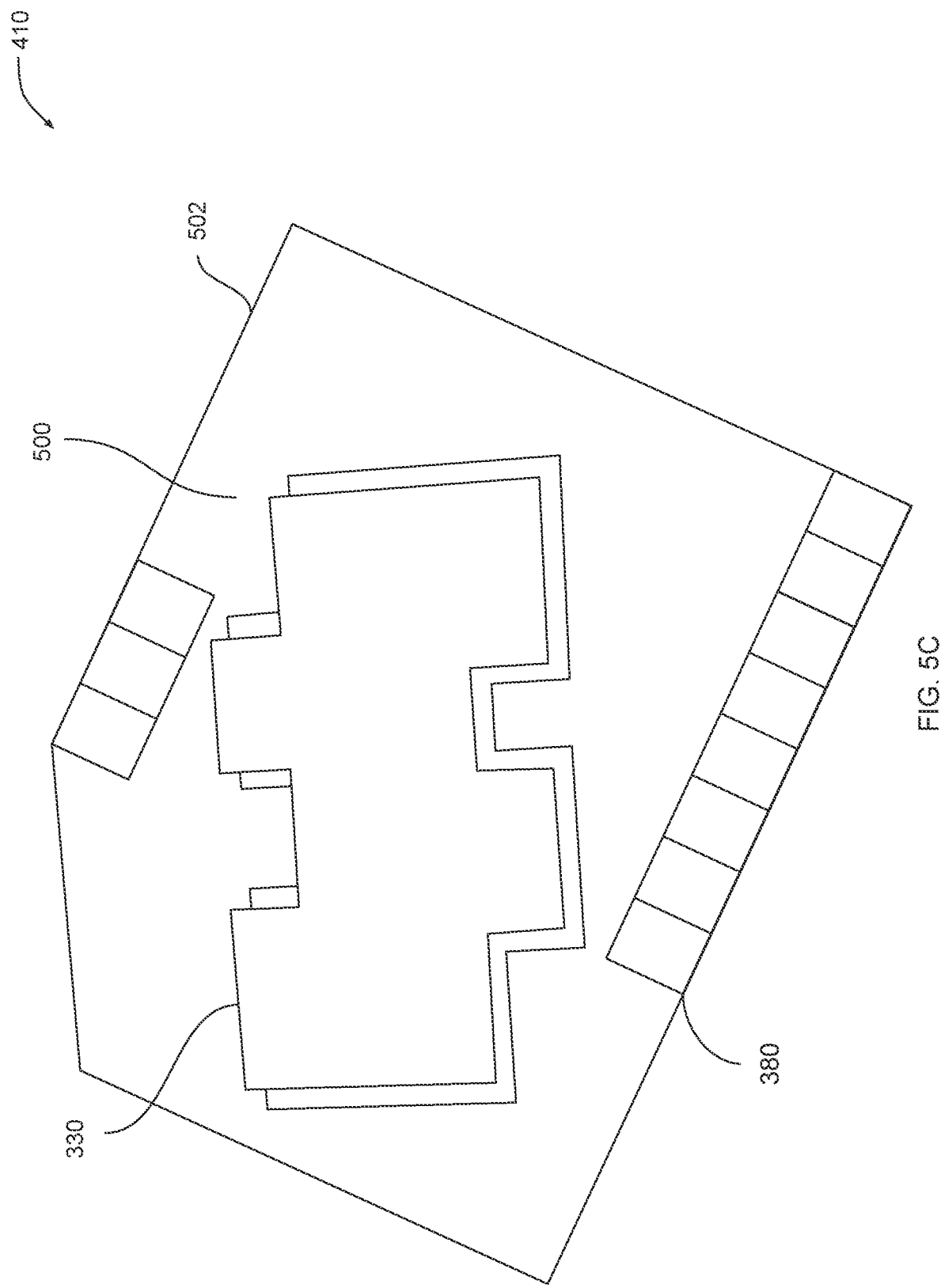

FIGS. 5A-5C illustrate how the design simulator of FIG. 3 executes a rigid body simulation, according to various embodiments. As shown in each of FIGS. 5A-5C, 3D volume 410 of FIG. 4 includes a design surface 500 that is demarcated by a boundary 510. Design surface 500 is a 2D or 3D surface that describes geometric and/or topographic attributes of the parcel of land while boundary 510 is a set of linear elements that describe a property boundary surrounding the parcel of land. In one embodiment, design surface 500 may be generated based on boundary 510. 3D volume 410 includes building model 330 and parking lot model 380, where those models are disposed on design surface 500.

Referring now to FIG. 5A, design simulator 390 configures rigid body simulation 400 with building model 330 and parking lot model 380 in the manner shown and assigns various sets of physical properties to those models, as described above in conjunction with FIG. 4. Design simulator 390 then executes rigid body simulation 400 across a sequence of simulation steps to simulate physical interactions between building model 330 and parking lot model 380, including collisions 510 between building model 330 and parking lot model 380.

Referring now to FIG. 5B, design simulator 390 detects collisions 510 and then applies one or more simulation rules that govern the dynamics of building model 330 and parking lot model 380, in general, and any collisions between those models, in particular. Design simulator 390 applies velocity vector 520 to building model 330 and velocity vector 530 to parking lot model 380. Conceptually, velocity vectors 520 and 530 describe how building model 330 and parking lot model 380 rebound off of one another following collisions 510.

Referring now to FIG. 5C, building model 330 and parking lot model 380 translate across design surface in response to velocity vectors 520 and 530, respectively, and come to occupy positions where no collisions occur, as is shown. When configured in this manner, building model 330 can be used to generate building design 322 and parking lot model 380 can be use to generate parking lot design 372.

Referring generally to FIGS. 5A-5C, design simulator 390 can implement the disclosed techniques to simulate physical interactions between any and all design elements included in a given design option 222. In addition, design simulator 390 can implement these techniques to simulate collisions and/or intersections between building model(s) 330 and slant planes that are derived from construction regulations 214 and that define the boundaries of 3D volume 410. Accordingly, rigid body simulation 400 may be implemented in order to generate feasible designs which comply with those construction regulations.

Figure 6:
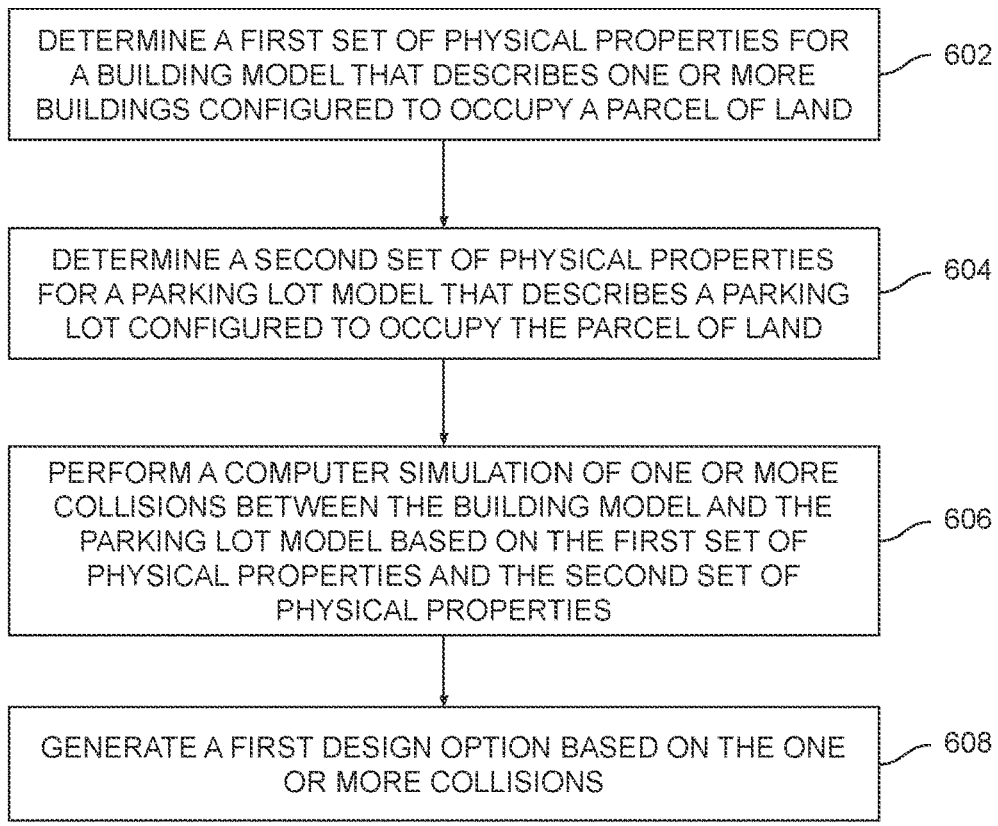
FIG. 6 is a flow diagram of method steps for generating design options for a multi-family housing project, according to various embodiments.

FIG. 6 is a flow diagram of method steps for generating design options for a multi-family housing project, according to various embodiments. Although the method steps are described in conjunction with the systems of FIGS. 1-5C, persons skilled in the art will understand that any system configured to perform the method steps in any order falls within the scope of the present embodiments.

As shown, a method 600 begins at step 602, where design simulator 390 within design generator 220 generates a first set of physical properties for building model 222 that describes one or more buildings configured to occupy a parcel of land. In particular, design simulator 390 assigns building model 330 position data 432, mass data 434, and velocity data 436 shown in FIG. 4. Position data 432 indicates one or more positions associated with building model 330 within rigid body simulation 400. Mass data 434 indicates one or more mass values associated with building model 330 within rigid body simulation 400. Velocity data 436 indicates one or more velocity values associated with building model 330 within rigid body simulation 400. Any of the above-described physical properties can be assigned to building model 330 as a whole, to different design elements of building model 330, and/or to specific subsets of vertices within the overarching 3D geometry associated with building model 330.

At step 604, design simulator 390 determines a second set of physical properties for parking lot model 372 that describes a parking lot configured to occupy the parcel of land. Specifically, design simulator 390 assigns parking lot model 380 position data 482, mass data 484, and velocity data 486, as shown in FIG. 4. Position data 482 indicates one or more positions associated with parking lot model 380 within rigid body simulation 400. Mass data 484 indicates one or more mass values associated with parking lot model 330 within rigid body simulation 400. Velocity data 486 indicates one or more velocity values associated with parking lot model 380 within rigid body simulation 400. Any of the above-described physical properties can be assigned to parking lot model 380 as a whole, to different design elements of parking lot model 380, and/or to specific subsets of vertices within the overarching 3D geometry associated with parking lot model 380.

At step 606, design simulator 390 performs a computer simulation of one or more collisions between the building model and the parking lot model based on the first set of physical properties and the second set of physical properties. Design simulator 390 can implement any of the collision components discussed above in conjunction with FIG. 3 in order to compute translations and/or rotations for building model 330 and/or parking lot model 380 that occur in response to collisions between 3D geometry associated with those models. Persons familiar with physical simulations will understand how design simulator 390 would use the various physical properties discussed herein in order to compute updated position data and velocity data for building model 330 and parking lot model 380 across different simulation steps and in response to various types of collisions.

At step 608, design generator 220 generates a first design option based on the one or more collisions. When rigid body simulation 400 terminates, the final positions of building model 330 and parking lot model 380 represent a specific configuration of design elements for a given design option 222. In this manner, design simulator 390 can generate different design options 222 having widely varying configurations of design elements.

In sum, a design engine is configured to automatically generate and position design elements within designs for a multi-family housing project that corresponds to a parcel of land. Each design simultaneously meets local construction regulations while also meeting specific financial targets. The design engine generates a site model that reflects geometric attributes of the parcel of land, a building model that describes one or more buildings configured to occupy the parcel of land, and a parking lot model that describes a parking lot configured to occupy a remaining portion of the parcel of land. A design simulator executes various types of physical simulations with the site model, the building model, and/or the parking lot model to generate a vast number of different design options having widely varying configurations of design elements. The design engine evaluates these design options to identify those which balance compliance with construction regulations and achievement of financial targets.

The design simulator executes a rigid body simulation to position the design elements within various design options according to configurations that meet design criteria while also promoting feasibility and desirability. The design simulator assigns physical properties to each design element, including a mass value and a velocity value, among other possible physical properties. The design simulator then simulates rigid body interactions between design elements over a sequence of simulation steps. A given rigid body interaction may include elastic or inelastic collisions between design elements, among other types of interactions. The design simulator stops the rigid body simulation when no collisions between design elements are detected or when other termination criteria are met. Once the rigid body simulation is complete, the final positions of each design element relative to one another represent a specific configuration of design elements for the corresponding design option.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to automatically position design elements relative to one another in design configurations that are feasible and desirable. These technical advantages represent tangible and meaningful technological improvements over conventional CAD applications.

1. Some embodiments include a computer-implemented method for generating designs for multi-family housing projects via a computer-aided design (CAD) application, the method comprising determining, via a design simulator included in the CAD application, a first set of physical properties for a building model that describes one or more buildings configured to occupy a parcel of land, determining, via the design simulator, a second set of physical properties for a parking lot model that describes a parking lot configured to occupy the parcel of land, performing, via the design simulator, a computer simulation to detect one or more collisions between the building model and the parking lot model based on the first set of physical properties and the second set of physical properties, and generating, via a design generator included in the CAD application, a first design option based on the one or more collisions.

2. The computer-implemented method of clause 1, wherein determining the first set of physical properties comprises computing at least one position value, at least one mass value, and at least one velocity value based on 3D geometry corresponding to the building model.

3. The computer-implemented method of any of clauses 1-2, wherein determining the second set of physical properties comprises computing at least one position value, at least one mass value, and at least one velocity value based on 3D geometry corresponding to the parking lot model.

4. The computer-implemented method of any of clauses 1-3, wherein performing the computer simulation comprises computing first position data included in the first set of physical properties based on first velocity data included in the first set of physical properties, computing second position data included in the second set of physical properties based on second velocity data included in the second set of physical properties, detecting the one or more collisions, re-computing the first position data and the first velocity data based on the second position data and the second velocity data, and re-computing the second position data and the second velocity data based on the first position data and the first velocity data.

5. The computer-implemented method of any of clauses 1-4, wherein performing the computer simulation comprises determining that 3D geometry associated with the building model intersects 3D geometry associated with the parking lot model.

6. The computer-implemented method of any of clauses 1-5, wherein the computer simulation comprises a rigid body simulation, and wherein performing the computer simulation comprises iteratively applying a set of simulation rules to the building model and the parking lot model according to a sequence of simulation steps.

7. The computer-implemented method of any of clauses 1-6, wherein generating the first design option comprises determining a first position that the building model occupies within the computer simulation in response to the one or more collisions, determining a second position that the parking lot model occupies within the computer simulation in response to the one or more collisions, and generating a design configuration that places the building model relative to the parking lot model based on the first position and the second position.

8. The computer-implemented method of any of clauses 1-7, further comprising determining that the building model does not intersect a set of slant planes associated with the parcel of land and, in response, concluding that the first design option complies with a first construction regulation.

9. The computer-implemented method of any of clauses 1-8, further comprising generating, via a site design generator within the CAD application, a three-dimensional volume that defines a region of space proximate to the parcel of land and is derived from the set of slant planes.

10. The computer-implemented method of any of clauses 1-9, wherein the three-dimensional volume includes a design surface on which the building model and the parking lot model are disposed when the computer simulation is performed.

11. Some embodiments include a non-transitory computer-readable medium of storing program instructions that, when executed by a processor, causes the process to generate designs for multi-family housing projects via a computer-aided design (CAD) application by performing the steps of determining, via a design simulator included in the CAD application, a first set of physical properties for a building model that describes one or more buildings configured to occupy a parcel of land, determining, via the design simulator, a second set of physical properties for a parking lot model that describes a parking lot configured to occupy the parcel of land, performing, via the design simulator, a computer simulation to detect one or more collisions between the building model and the parking lot model based on the first set of physical properties and the second set of physical properties, and generating, via a design generator included in the CAD application, a first design option based on the one or more collisions.

12. The non-transitory computer-readable medium of clause 11, wherein the step of determining the first set of physical properties comprises computing at least one position value, at least one mass value, and at least one velocity value based on 3D geometry corresponding to the building model.

13. The non-transitory computer-readable medium of any of clauses 11-12, wherein the step of determining the second set of physical properties comprises computing at least one position value, at least one mass value, and at least one velocity value based on 3D geometry corresponding to the parking lot model.

14. The non-transitory computer-readable medium of any of clauses 11-13, wherein the step of performing the computer simulation comprises computing first position data included in the first set of physical properties based on first velocity data included in the first set of physical properties, computing second position data included in the second set of physical properties based on second velocity data included in the second set of physical properties, detecting the one or more collisions, re-computing the first position data and the first velocity data based on the second position data and the second velocity data, and re-computing the second position data and the second velocity data based on the first position data and the first velocity data.

15. The non-transitory computer-readable medium of any of clauses 11-14, wherein the step of performing the computer simulation comprises determining that 3D geometry associated with the building model intersects 3D geometry associated with the parking lot model.

16. The non-transitory computer-readable medium of any of clauses 11-15, wherein the computer simulation comprises a rigid body simulation, and wherein performing the computer simulation comprises iteratively applying a set of simulation rules to the building model and the parking lot model according to a sequence of simulation steps.

17. The non-transitory computer-readable medium of any of clauses 11-16, wherein the step of generating the first design option comprises determining a first position that the building model occupies within the computer simulation in response to the one or more collisions, determining a second position that the parking lot model occupies within the computer simulation in response to the one or more collisions, and generating a design configuration that places the building model relative to the parking lot model based on the first position and the second position.

18. The non-transitory computer-readable medium of any of clauses 11-17, wherein the first set of physical properties includes at least one physical property having a value that constrains movement of the building model when the simulation is performed.

19. The non-transitory computer-readable medium of any of clauses 11-18, wherein the first set of physical properties includes at least one physical property having a value that is derived from user input.

20. Some embodiments include a system, comprising a memory storing a computer-aided design (CAD) application, and a processor that, when executing the CAD application, is configured to perform the steps of determining, via a design simulator included in the CAD application, a first set of physical properties for a building model that describes one or more buildings configured to occupy a parcel of land, determining, via the design simulator, a second set of physical properties for a parking lot model that describes a parking lot configured to occupy the parcel of land, performing, via the design simulator, a computer simulation to detect one or more collisions between the building model and the parking lot model based on the first set of physical properties and the second set of physical properties, and generating, via a design generator included in the CAD application, a first design option based on the one or more collisions.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for multi-family housing projects via a computer-aided design (CAD) application, the method comprising:
   determining, via a design simulator included in the CAD application, a first set of physical properties for a building model that describes one or more buildings configured to occupy a parcel of land;
   determining, via the design simulator, a second set of physical properties for a parking lot model that describes a parking lot configured to occupy the parcel of land;
   performing, via the design simulator, a computer simulation to detect one or more collisions between the building model and the parking lot model based on the first set of physical properties and the second set of physical properties and to determine a rotation of the building model that is caused by the one or more collisions based on physical dynamics of the building model resulting from the one or more collisions; and
   generating, via a design generator included in the CAD application, a first design option based on the one or more collisions and the rotation of the building model.

2. The computer-implemented method of claim 1, wherein determining the first set of physical properties comprises computing at least one position value, at least one mass value, and at least one velocity value based on 3D geometry corresponding to the building model.

3. The computer-implemented method of claim 1, wherein determining the second set of physical properties comprises computing at least one position value, at least one mass value, and at least one velocity value based on 3D geometry corresponding to the parking lot model.

4. The computer-implemented method of claim 1, wherein performing the computer simulation comprises:
   computing first position data included in the first set of physical properties based on first velocity data included in the first set of physical properties;
   computing second position data included in the second set of physical properties based on second velocity data included in the second set of physical properties;
   detecting the one or more collisions;
   re-computing the first position data and the first velocity data based on the second position data and the second velocity data; and
   re-computing the second position data and the second velocity data based on the first position data and the first velocity data.

5. The computer-implemented method of claim 1, wherein performing the computer simulation comprises determining that 3D geometry associated with the building model intersects 3D geometry associated with the parking lot model.

6. The computer-implemented method of claim 1, wherein the computer simulation comprises a rigid body simulation, and wherein performing the computer simulation comprises iteratively applying a set of simulation rules to the building model and the parking lot model according to a sequence of simulation steps.

7. The computer-implemented method of claim 1, wherein generating the first design option comprises:
 determining a first position that the building model occupies within the computer simulation in response to the one or more collisions;
 determining a second position that the parking lot model occupies within the computer simulation in response to the one or more collisions; and
 generating a design configuration that places the building model relative to the parking lot model based on the first position and the second position.

8. The computer-implemented method of claim 1, further comprising determining that the building model does not intersect a set of slant planes associated with the parcel of land and, in response, concluding that the first design option complies with a first construction regulation.

9. The computer-implemented method of claim 8, further comprising generating, via a site design generator within the CAD application, a three-dimensional volume that defines a region of space proximate to the parcel of land and is derived from the set of slant planes.

10. The computer-implemented method of claim 8, wherein the three-dimensional volume includes a design surface on which the building model and the parking lot model are disposed when the computer simulation is performed.

11. The computer-implemented method of claim 1, wherein the physical dynamics of the building model resulting from the one or more collisions are determined based on a physical simulation of how the building model rebounds off the parking lot model after the one or more collisions.

12. The computer-implemented method of claim 1, wherein the physical dynamics of the building model resulting from the one or more collisions are determined by applying a velocity vector to the building model that governs how the building model rebounds off the parking lot model after the one or more collisions.

13. One or more non-transitory computer-readable media including instructions that, when executed by one or more processors, cause the one or more processors to generate designs for multi-family housing projects via a computer-aided design (CAD) application by performing the steps of:
 determining, via a design simulator included in the CAD application, a first set of physical properties for a building model that describes one or more buildings configured to occupy a parcel of land;
 determining, via the design simulator, a second set of physical properties for a parking lot model that describes a parking lot configured to occupy the parcel of land;
 performing, via the design simulator, a computer simulation to detect one or more collisions between the building model and the parking lot model based on the first set of physical properties and the second set of physical properties and to determine a rotation of the building model in response to that is caused by the one or more collisions based on physical dynamics of the building model resulting from the one or more collisions; and
 generating, via a design generator included in the CAD application, a first design option based on the one or more collisions and the rotation of the building model.

14. The one or more non-transitory computer-readable media of claim 13, wherein the step of determining the first set of physical properties comprises computing at least one position value, at least one mass value, and at least one velocity value based on 3D geometry corresponding to the building model.

15. The one or more non-transitory computer-readable media of claim 13, wherein the step of determining the second set of physical properties comprises computing at least one position value, at least one mass value, and at least one velocity value based on 3D geometry corresponding to the parking lot model.

16. The one or more non-transitory computer-readable media of claim 13, wherein the step of performing the computer simulation comprises:
 computing first position data included in the first set of physical properties based on first velocity data included in the first set of physical properties;
 computing second position data included in the second set of physical properties based on second velocity data included in the second set of physical properties;
 detecting the one or more collisions;
 re-computing the first position data and the first velocity data based on the second position data and the second velocity data; and
 re-computing the second position data and the second velocity data based on the first position data and the first velocity data.

17. The one or more non-transitory computer-readable media of claim 13, wherein the step of performing the computer simulation comprises determining that 3D geometry associated with the building model intersects 3D geometry associated with the parking lot model.

18. The one or more non-transitory computer-readable media of claim 13, wherein the computer simulation comprises a rigid body simulation, and wherein performing the computer simulation comprises iteratively applying a set of simulation rules to the building model and the parking lot model according to a sequence of simulation steps.

19. The one or more non-transitory computer-readable media of claim 13, wherein the step of generating the first design option comprises:
 determining a first position that the building model occupies within the computer simulation in response to the one or more collisions;
 determining a second position that the parking lot model occupies within the computer simulation in response to the one or more collisions; and
 generating a design configuration that places the building model relative to the parking lot model based on the first position and the second position.

20. The one or more non-transitory computer-readable media of claim 13, wherein the first set of physical properties includes at least one physical property having a value that constrains movement of the building model when the simulation is performed.

21. The one or more non-transitory computer-readable media of claim 13, wherein the first set of physical properties includes at least one physical property having a value that is derived from user input.

22. A system, comprising:
 a memory storing a computer-aided design (CAD) application; and
 a processor that, when executing the CAD application, is configured to perform the steps of:
  determining, via a design simulator included in the CAD application, a first set of physical properties for a building model that describes one or more buildings configured to occupy a parcel of land, determining, via the design simulator, a second set of physical properties for a parking lot model that describes a parking lot configured to occupy the parcel of land, performing, via the design simulator, a computer simulation to detect one or more collisions between the building model and the parking lot model based on the first set of physical properties and the second set of physical properties and to determine a rotation of the building model that is caused by the one or more collisions based on physical dynamics of the building model resulting from the one or more collisions, and generating, via a design generator included in the CAD application, a first design option based on the one or more collisions and the rotation of the building model.

23. The computer-implemented method of claim 1, wherein:

performing the computer simulation further comprises determining a rotation of the parking lot model that is caused by the one or more collisions; and generating the first design option is further based on the rotation of the parking lot model.

* * * * *

UNITED STATES PATENT AND TRADEMARK OFFICE
CERTIFICATE OF CORRECTION

PATENT NO. : 11,816,397 B2
APPLICATION NO. : 17/099665
DATED : November 14, 2023
INVENTOR(S) : David Benjamin, Dale Zhao and Lorenzo Villaggi It is certified that error appears in the above-identified patent and that said Letters Patent is hereby corrected as shown below:

In the Claims

Column 21, Claim 13, Line 58, please delete "in response to".

Signed and Sealed this
Twenty-third Day of January, 2024

Katherine Kelly Vidal
*Director of the United States Patent and Trademark Office*